US009218228B2

(12) United States Patent
Schüepp (10) Patent No.: US 9,218,228 B2
(45) Date of Patent: Dec. 22, 2015

(54) COMPUTERISED MACHINE CONTROL SYSTEM

(75) Inventor: Michael Schüepp, Illnau (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/241,865

(22) PCT Filed: Aug. 22, 2012

(86) PCT No.: PCT/CH2012/000197
§ 371 (c)(1),
(2), (4) Date: Jun. 23, 2014

(87) PCT Pub. No.: WO2013/029189
PCT Pub. Date: Mar. 7, 2013

(65) Prior Publication Data
US 2014/0298359 A1  Oct. 2, 2014

(30) Foreign Application Priority Data
Aug. 31, 2011 (CH) ...................................... 1428/11

(51) Int. Cl.
G06F 13/00 (2006.01)
G06F 9/54 (2006.01)
G05B 19/409 (2006.01)

(52) U.S. Cl.
CPC .............. *G06F 9/541* (2013.01); *G05B 19/409* (2013.01); *G05B 2219/33141* (2013.01)

(58) Field of Classification Search
CPC ............................ G06F 9/45512; G06F 9/465
USPC ................................................. 719/316, 320
See application file for complete search history.

(56) References Cited

U.S. PATENT DOCUMENTS

| 6,424,872 | B1 | 7/2002 | Glanzer |
| 7,089,560 | B1 * | 8/2006 | Uhler et al. .................... 719/311 |
| 8,542,104 | B2 * | 9/2013 | Horowitz ..................... 340/10.5 |
| 2007/0073750 | A1 * | 3/2007 | Chand et al. .................. 707/101 |

FOREIGN PATENT DOCUMENTS

DE  10 2009 048746 A1  4/2011

OTHER PUBLICATIONS

Thamboulidis, K.C., et al., "Semantic Web Services in the Development of Distributed Control and Automation Systems," 2007, IEEE International Conference on Robotics and Automation, Apr. 10-14, 2007.
English translation of the International Search Report dated Dec. 5, 2012, International Application No. PCT/CH2012/000197.
English translation of the Written Opinion of the International Searching Authority, International Application No. PCT/CH2012/000197.
English translation of the International Preliminary Report on Patentability dated Mar. 4, 2014, International Application No. PCT/CH2012/000197.

* cited by examiner

Primary Examiner — Andy Ho
(74) Attorney, Agent, or Firm — Knobbe, Martens, Olson & Bear, LLP (57) ABSTRACT

A computerized machine control system comprises an application-independent machine-specific part with a machine-specific domain model of the machine and a control module, which accesses data points of the machine via a machine-specific communication protocol and updates corresponding data point objects in the machine-specific domain model or data points in the machine. In addition, the machine control system comprises a machine-independent, application-specific part with an application-specific domain model and a mapping module which accesses the machine-specific domain model and maps data objects of the application-specific domain model to data point objects of the machine-specific domain model and vice versa.

18 Claims, 8 Drawing Sheets

COMPUTERISED MACHINE CONTROL SYSTEM

This application is the U.S. National Phase under 35 U.S.C. §371 of International Application No. PCT/CH2012/000197, filed Aug. 22, 2012, which claims priority to Swiss Application No. 01428/11, filed Aug. 31, 2011.

BACKGROUND OF THE INVENTION

1. Technical Field

The present invention relates to a computerized machine control system. The present invention relates in particular to a computerized machine control system for controlling machines, such as printers, printed product processing machines, conveyance machines, etc.

2. Background

The control of machines, such as printers, printed product processing machines, conveyance machines, etc., as a rule occurs by programmable devices, which are accessed by higher-level computerized management and/or operating systems via proprietary communication protocols. The programmable devices are, for example, so-called programmable logic controllers (PLC), which are connected electrically to sensors and actors of the machine. When machines are replaced, for example, by products from another manufacturer, expensive and complex adaptations in program applications of the management and/or operating systems have to be carried out as a rule. The same problem also arises when an installation of several machines is expanded with a machine from another manufacturer. The proprietary communication protocols also make direct interaction among machines from different manufacturers exceedingly difficult, if it is possible at all.

SUMMARY

One purpose of the present invention is to propose a computerized machine control system, which does not have at least some of the disadvantages of the known systems. In particular, one problem of the present invention is to propose a computerized machine control system for controlling machines, which allows an improved integration of machines from different manufacturers.

According to the present invention, these aims are achieved by the features of the independent claims. Additional advantageous embodiments arise moreover from the dependent claims and from the description.

The above-mentioned aims are achieved by the present invention in particular in that a computerized machine control system with a communication module for communication with applications of a higher-lever management or operating system comprises an application-independent, machine-specific part and a machine-independent, application-specific part. The application-independent, machine-specific part comprises a machine-specific domain model with data points of the machine, and a control module, which is, arranged to access via a machine-specific communication protocol the data points of the machine and to update corresponding data point objects in the machine-specific domain model or data points in the machine. The machine-independent, application-specific part comprises an application-specific domain model with data objects, which the management or operating system can access via the communication module, and a mapping module which is arranged to access the machine-specific domain model and to map data objects to data point objects or data point objects to data objects.

In an embodiment variant, the control module is arranged so as to periodically access the data points of the machine, in order to update the corresponding data point objects in the machine-specific domain model, and the machine-specific domain model is arranged so as to transfer values of data point objects in the machine-specific domain model only upon request to the application-specific part.

In an additional embodiment variant, the control model is arranged to access via a programmable logic controller the data points of the machine, wherein the machine-specific communication protocol is geared specifically toward the programmable logic controller, and the machine-specific domain model comprises data point objects of those data points of the machines that are available via the programmable logic controller.

In an embodiment variant, the control module is arranged in order to update the data point objects in the machine-specific domain model only when the data points that have been accessed via the programmable logic controller are in a consistent status.

In a preferred embodiment variant, the application-specific domain model is designed as a service of a service-oriented architecture platform, which is accessible to the management or operating system, wherein a service definition and the data objects of the application-specific domain model are defined for the applications of the higher-level management or operating system via an interface of the service-oriented architecture platform, which is accessible to the management or operating system. The communication module comprises, for example, a run-time module with communication functions of the Windows Communication Foundation (WCF), and the application-specific domain model is implemented as a WCF service, wherein a service definition and the data objects of the application-specific domain model for the applications of the higher-level management or operating system are defined via a WCF contract interface.

In a preferred embodiment variant, the machine-specific domain model is implemented as an available service of a service-oriented architecture platform, wherein a service definition and the data point objects of the machine-specific domain model are defined via an interface of the service-oriented architecture platform, which is accessible to service consumers, and the service is accessible to the service consumers via the service-oriented architecture platform. The machine-specific domain model is implemented, for example, as a WCF service, wherein a service definition and the data objects of the machine-specific domain model are defined via a WCF contract interface.

In an embodiment variant, the services of the service-oriented architecture platform are each arranged so as to receive periodic hold-active calls from the higher-level management or operating system, so as to respond directly with a hold-active response to guarantee connections to the management or operating system.

In an additional variant, the control module is arranged so as to periodically check the availability of the machine and to assign a value to a machine-specific domain model, which indicates that the domain model is not connected to the machine, if there is no response message to the query message within a predefined period of time.

In addition to the computerized machine control system, the invention also relates to a computer-implemented method for controlling machines and to a computer program product for controlling a machine control system. It is preferable for the computer program product to comprise a computer-readable medium with computer program code stored thereon, for controlling one or more processors of a machine control system, so that the machine control system carries out the method for controlling machines. Here, the steps that are carried out are that the machine control system creates a machine-specific domain model with data points of the machine, model which is independent of applications of a higher-level management or operating system, and it accesses the data points of the machine via a machine-specific communication protocol, and updates corresponding data point objects in the machine-specific domain model or data points in the machine. In addition, the machine control system creates a machine-independent, application-specific domain model with data objects, which are accessible to the management or operating system, and it accesses the machine-specific domain model and maps data objects to data point objects or data point objects to data objects.

BRIEF DESCRIPTION OF THE DRAWINGS

Below, an embodiment of the present invention is described in reference to an example. An example of the embodiment is illustrated in the following appended figures.

DETAILED DESCRIPTION OF THE PREFERRED EMBODIMENT

Figure 1:
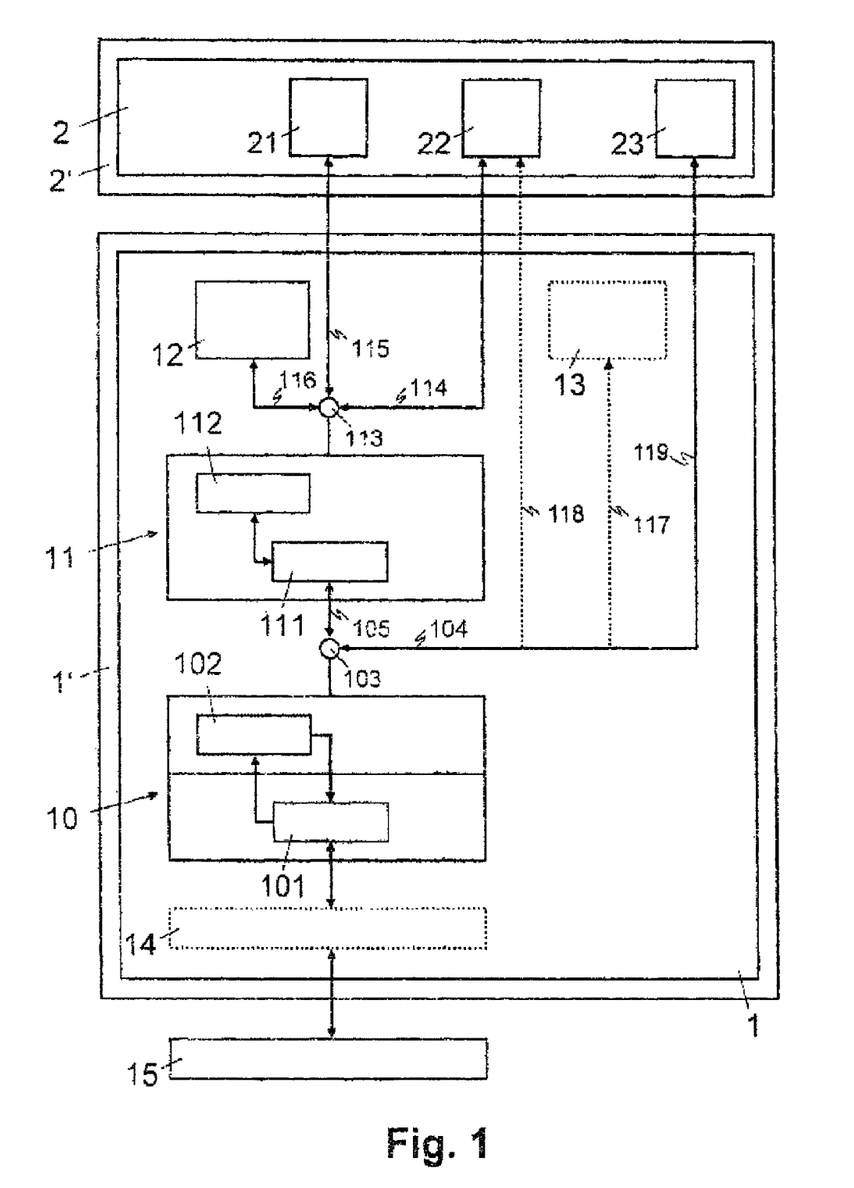
FIG. 1: shows a block diagram which diagrammatically illustrates a computerized machine control system which comprises an application-independent, machine-specific part and a machine-independent, application-specific part, in order to access data points of a machine.
Figure 2:
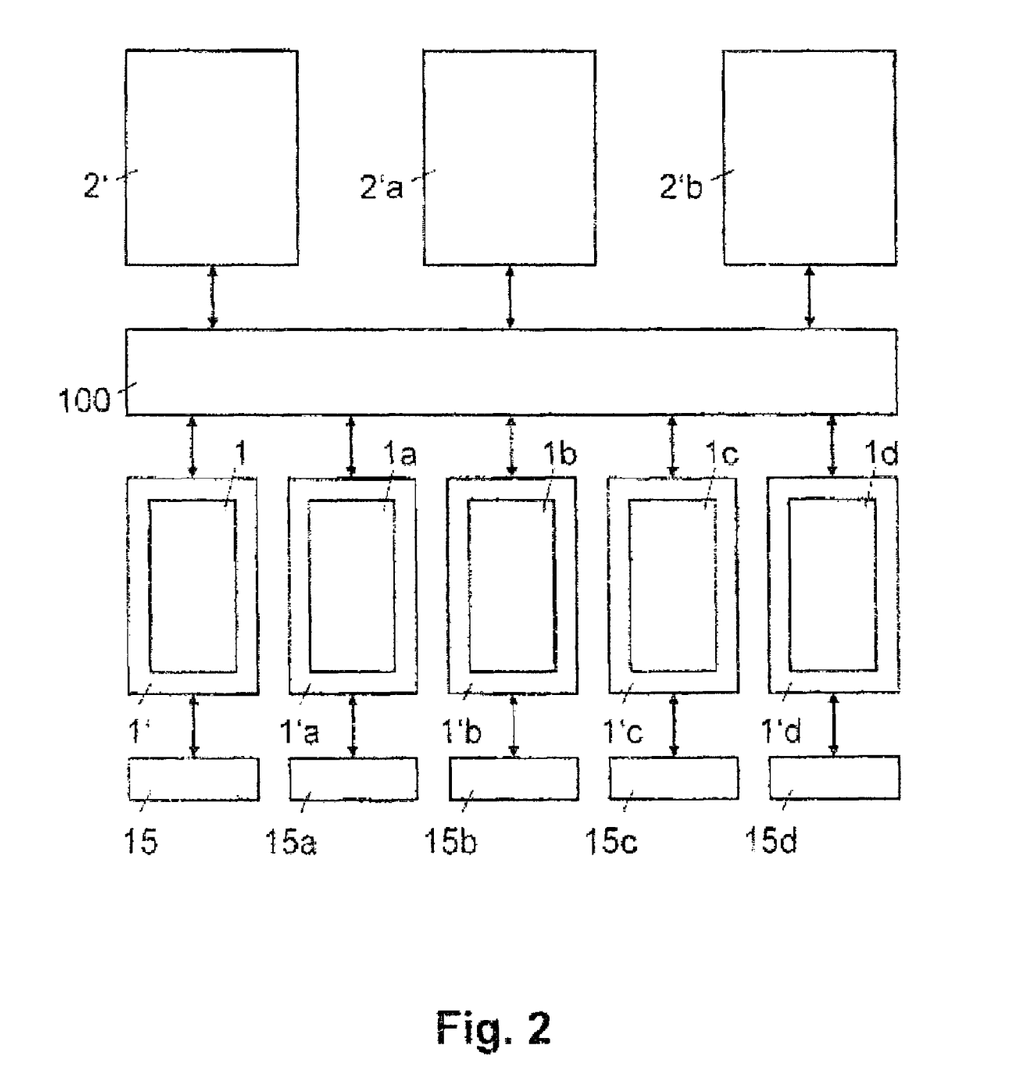
FIG. 2: shows a block diagram which diagrammatically illustrates several computerized machine control systems and higher-level management and operating systems which are connected in a communication-enabled manner to each other via a service-oriented architecture platform.
Figure 3:
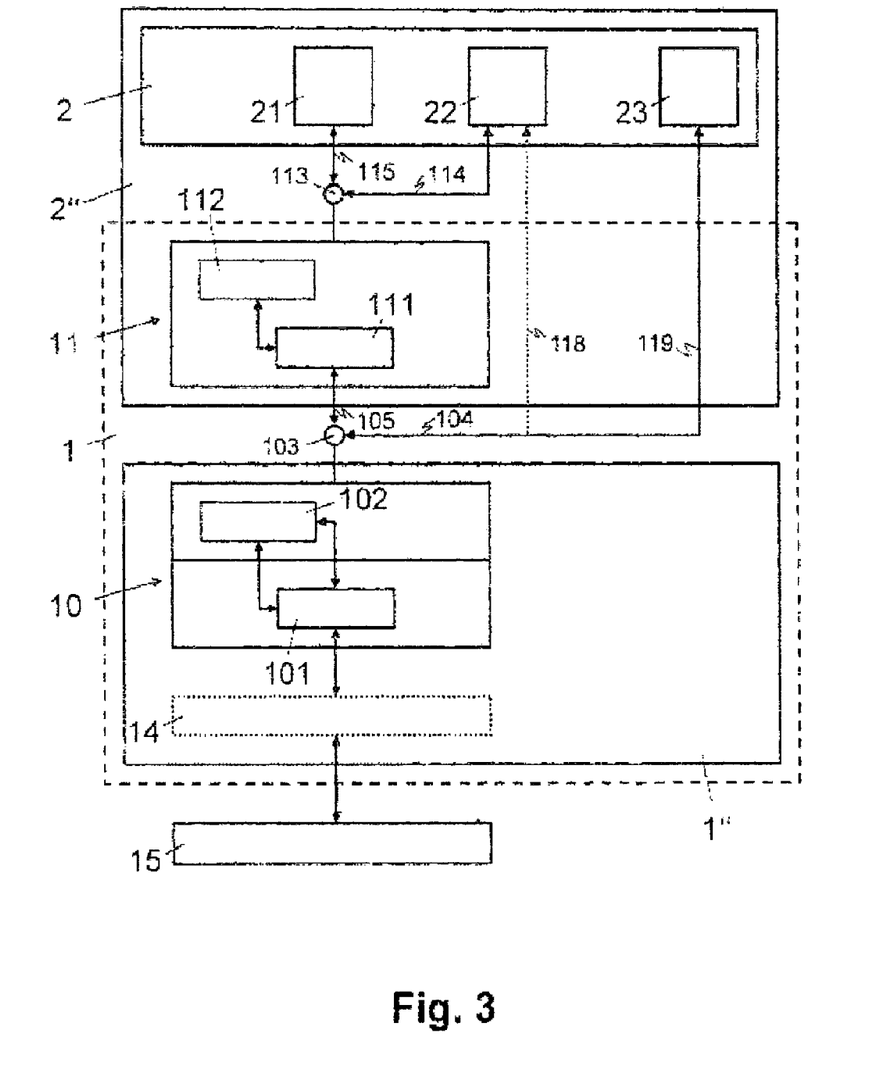
FIG. 3: shows a block diagram which diagrammatically illustrates a computerized machine control system in which, for accessing data points of a machine, an application-independent, machine-specific part and a machine-independent, application-specific part are implemented on different computer systems and connected in a communication-enabled manner to each other via a service-oriented architecture platform.

In FIGS. 1, 2 and 3, reference numeral 1 refers to a computerized machine control system for controlling machines 15, for example, printers, printed product processing machines, conveyance machines, etc. The control of the machine 15 occurs via a programmable device, for example, via a so-called Programmable Logic Controller (PLC) 14, which is connected (electrically) to sensors and actors of the machine 15. Depending on the embodiment variant, the programmable device 15 is connected directly or via a microcontroller of the machine 15 to the machine 15 or its sensors and actors.

In FIGS. 1 and 3, the reference numeral 2 relates to a computerized management or operating system. The management or operating system 2 is implemented on an operative computer system 2' with one or more processors, which are connected to one or more displays, for example, to touch sensitive displays, in particular so-called multitouch displays.

As shown diagrammatically in FIGS. 1 and 3, the management or operating system 2 comprises several functional modules, for example, a user interface 21 for configuring, monitoring and operating the production of one or more machines 15, 15a, 15b, 15c, 15d; a user interface 23 for maintaining and diagnosing one or more machines 15, 15a, 15b, 15c, 15d; and a service module 22 with several higher-level services, so-called high level services, such as, for example, commands for starting, stopping or interrupting the production, which are accessible to and executable by service consumers, such as the user interfaces 21, 23. As described in greater detail below, the user interfaces 21, 23 are preferably based on so-called plug-ins and they comprise several selectable and activatable widget plug-ins. The service module 22 is preferably implemented as a plug-in and a service of a service-oriented architecture platform 100, for example, the Windows Communication Foundation (WCF) in .Net of Microsoft Corporation.

As shown in FIGS. 1 and 3, the machine control system 1 comprises functional modules, which are subdivided into an application-independent, machine-specific part 10 and a machine-independent, application-specific part 11. Depending on the embodiment variant and/or configuration, the functional modules of the machine control system 1 comprise in addition a user interface 12 for configuring, monitoring and operating the production of one or more machines 15, 15a, 15b, 15c, 15d and/or a user interface 13 for maintaining and diagnosing one or more machines 15, 15a, 15b, 15c, 15d. The user interfaces 12, 13 are preferably based on so-called plug-ins and they comprise several selectable and activatable widget plug-ins, as described below in greater detail.

In the embodiment variant according to FIG. 1, the machine-specific part 10 and the application-specific part 11 are implemented on the same operative computer system 1', for example, on one or more separate processors which are connected to the PLC 14, or on one or more processors of the PLC 14. The computer system 1' with the machine control system 1 is implemented as part of the machine 15, attached directly to the machine 15 or arranged separately and at a distance therefrom. The computer system 1' is implemented as a so-called embedded PC, for example.

In the embodiment variant according to FIG. 3, the machine-specific part 10 and the application-specific part 11 are implemented on different computer systems 1", 2". Here, the machine-specific part 10 is implemented on the computer system 1", for example, on one or more separate processors, which are connected to the PLC 14, or on one or more processors of the PLC 14. The computer system 1" with the machine-specific part 10 is implemented as part of the machine 15, connected directly to the machine 15 or arranged separately and at a distance therefrom. The application-specific part 11, on the other hand, is implemented on the computer system 2" of the management or operating system 2.

The machine-specific part 10 comprises a control module 101 and a machine-specific domain model 102. The control module 101 is arranged so as to access, via a machine-specific communication protocol, for example, TCP/IP, Profibus, or ADS (Automation Device Specification) from the company Beckhoff, the data points of the machine 15, in order to read or write the current value of one or more data points.

Here, a data point is a value that is output by the machine 15, for example, a measurement or counter value of a sensor or counter of the machine 15, or that is input into the machine 15, for example, a control command, control parameter or control value. Data points comprise in particular also (current) status values and status information of the machine 15. A data point represents the input or output of values of the machine 15, in particular via a processor of the machine 15. The machine-specific domain model 102 comprises machine-specific data point objects. Here, the machine-specific data point objects are data objects, which map one or more data points of the machine 15. When the control module 101 accesses via the PLC 14 the data points of the machine 15, the machine-specific communication protocol is geared specifically toward the corresponding PLC 14, and the machine-specific domain model 102 comprises exclusively data point objects that are accessible via the PLC 14. The reading process occurs periodically and in addition based on an explicit read command. Current values of read data points are written by the control module 101 into a corresponding data point object of the machine-specific domain model 102. The writing process occurs as a rule based on an explicit write or service command to the machine-specific domain model 102. Here, the current value of the corresponding data point object in the machine-specific domain model 102 is written by the control module 101 into the corresponding data point of the machine 15 or of the PLC 14. Here, it should be noted that a data point—and correspondingly also a data point object—can comprise several data values, for example, a table or matrix of data values, which are arranged in a (structured) file.

In an embodiment variant, the control module 101 stores the data points acquired directly by the machine 15 or via the PLC 14 in a buffer memory and updates the corresponding data point objects in the machine-specific domain model 102 only when all or at least a defined portion of the data points are in a consistent status, that is to say none of the corresponding data points has a value of an old status or of an unstable intermediate status. Thus, snapshots with current and status-consistent data points of the machine 15 or of defined parts of the machine 15 are generated.

In a further variant, the control module 101 periodically checks whether the machine 15 or the PLC 14 is available, i.e., connected, operative and accessible. For this purpose, the control module 101 periodically sends corresponding query messages to the machine 15 or the PLC 14. If no return message is received by the machine 15 or the PLC 14 within a defined duration in the control module 101, the control module 101 sets a status assigned to the machine-specific domain model 102 to a value, which indicates that the domain model 102 is not connected to the machine 15.

The application-specific part 11 comprises an application-specific domain model 112 and a mapping module 111. The application-specific domain model 112 comprises application-specific data objects. The mapping module 111 is arranged to access the machine-specific domain model 102 via the corresponding service 103 of the service-oriented architecture platform 100. In a writing function, application-specific data objects are mapped to machine-specific data point objects; in the process the mapping module 111 writes current values of application-specific data objects into associated data point objects of the machine-specific domain model 102. In a reading function, machine-specific data point objects are mapped to application-specific data objects; in the process the mapping module 111 reads current values of one or more machine-specific data point objects and writes them into associated data objects of the application-specific domain model 112. Both the reading process and also the writing process occur exclusively based on explicit write, read or service commands to the application-specific domain model 112.

The machine-specific domain model 102 and the application-specific domain model 112 are preferably implemented as available services 103 or 113 of the service-oriented architecture platform 100, for example, WCF. Here, the available functions, for example, writing or reading, and data point objects or application-specific data objects of the domain models 102, 112 are defined and retrievable via an interface of the service-oriented architecture platform 100, which is accessible to service consumers. The defined services 103, 113 are accessible to service consumers via the service-oriented architecture platform 100, as indicated diagrammatically in FIGS. 1 and 3 by the arrows 104 and 105 or 114, 115 and 116. The domain models 102, 112 deliver to their service consumers machine-specific data point objects or application-specific data objects only upon request, i.e., when the service consumer accesses the corresponding service 103, 113 and requests the corresponding data point object or data object. For example, the application-specific part 11 receives data point objects from the machine-specific domain model 102 only when said part explicitly requests said objects via the corresponding service 103, and the user interfaces 12, 13, 21 and the service module 22 receive from the application-specific part 11 data objects from the application-specific domain model 112 only when they request said data objects explicitly via the corresponding service 113.

As indicated diagrammatically with the arrows 117, 118 and 119, in a variant the service module 22 and the user interfaces 23 and 13 are arranged so as to access the machine-specific domain model 102 directly via the service 103. For this purpose, machine-specific adaptations of service module 22 and user interfaces 23, 13 are required.

For the data exchange, the computer systems 1', 1", 2', 2" are connected via a communication connection, for example, via a data bus or a local network (LAN). The communication among the functional modules, which are implemented as services of the service-oriented architecture platform 100, occurs preferably via communication functions of the service-oriented architecture platform 100, for example, WCF, which are available, for example, as part of a run-time environment of the service-oriented architecture platform 100. In order to prevent connections between services of the service-oriented architecture platform 100 from being terminated due to inactivity within a defined duration (timeout), the functional modules implemented as services are arranged so as to transfer periodic hold-active calls to those services of which they are service consumers, or to receive periodic hold-active calls from their service consumers and directly respond with a hold-active response.

FIG. 2 illustrates an installation with several machines 15, 15a, 15b, 15c, 15d, each controlled by a machine control system 1, 1a, 1b, 1c, 1d, whose functional modules, as illustrated in FIG. 1, are implemented on a common computer system 1', 1'a, 1'b, 1'c, 1'd. As can be seen in FIG. 2, the management or operating system 2 is implemented on several operative computer systems 2', 2'a, 2'b, and it comprises several mutually complementary and/or redundant program applications (application). As diagrammatically illustrated in FIG. 2, the functional modules of the machine control systems 1, 1a, 1b, 1c, 1d and of the management or operating system 2, which are implemented on the computer systems 1', 1'a, 1'b, 1'c, 1'd, 2', 2'a, 2'b, communicate and interact via the service-oriented architecture platform 100, for example, WCF, and its communication functions.

Figure 4:
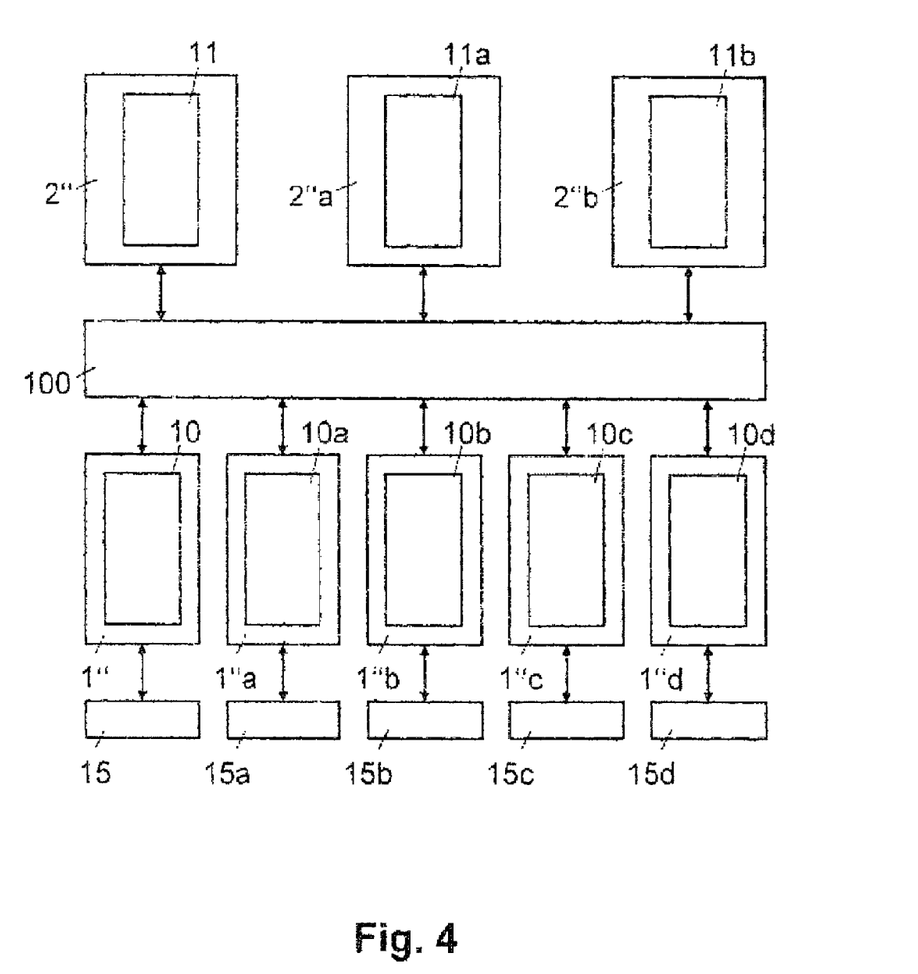
FIG. 4: shows a block diagram which diagrammatically illustrates several computerized machine control systems and higher-level management and operating systems, in which the application-independent, machine-specific parts and the machine-independent, application-specific parts are implemented on different computer systems and connected in a communication-enabled manner to each other via a service-oriented architecture platform.

FIG. 4 illustrates an installation with several machines 15, 15a, 15b, 15c, 15d, each of which is controlled by a machine control system 1, whose functional modules, as illustrated in FIG. 3, are each implemented on different computer systems. The machine-specific parts 10, 10a, 10b, 10c, 10d are each implemented on the computer system 1", 1"a, 1"b, 1"d connected to the corresponding machine 15, 15a, 15b, 15c, 15d. The application-specific parts 11, 11a, 11b, on the other hand, are implemented on the computer systems 2", 2"a, 2"b of the management or operating system 2, which comprises several mutually complementary and/or redundant program applications. As illustrated diagrammatically in FIG. 4, the functional modules of the machine-specific parts 10, 10a, 10b, 10c, 10d, of the application-specific parts 11, 11a, 11b and of the management or operating system 2, modules which are implemented on the computer systems 1", 1"a, 1"b, 1"c, 1"d, 2", 2"a, 2"b, communicate and interact via the service-oriented architecture platform 100, for example, WCF, and via its communication functions.

Figure 5:
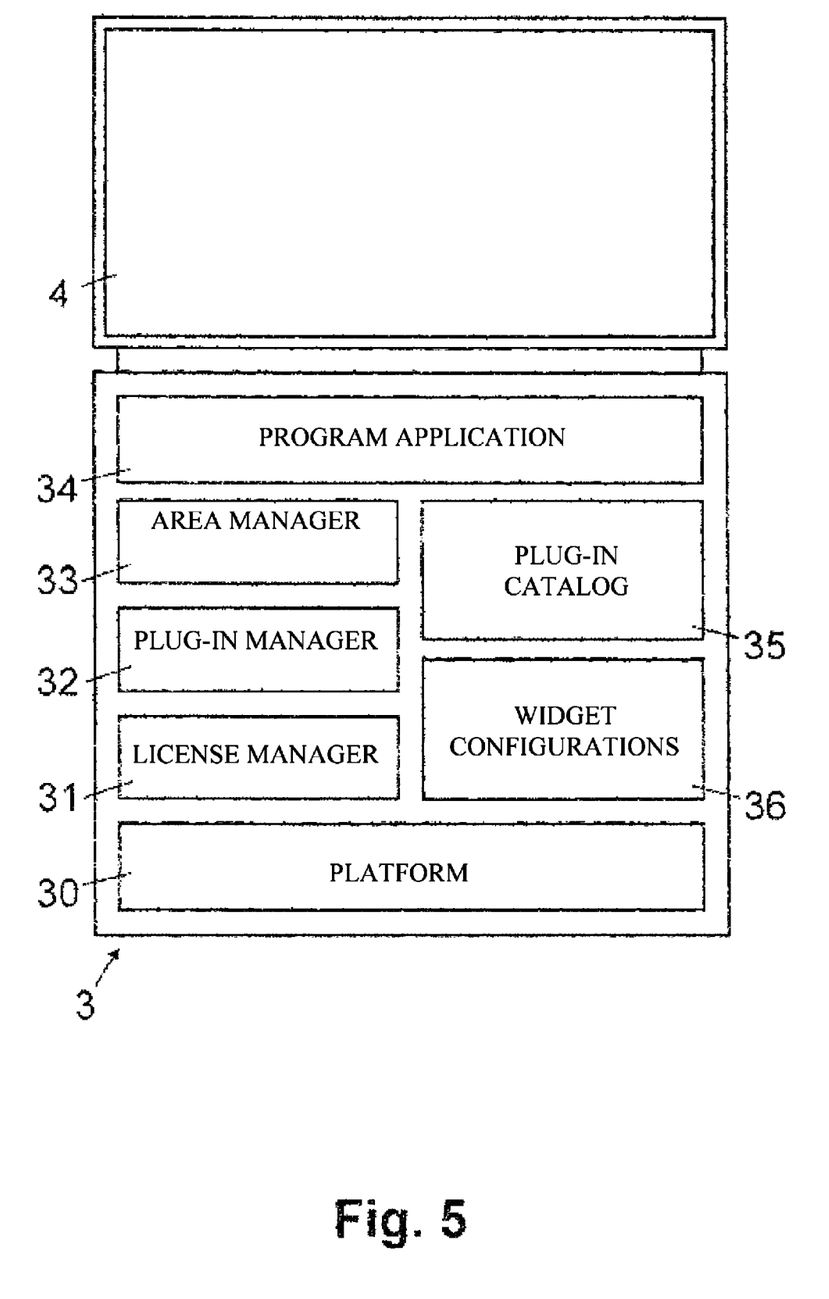
FIG. 5: shows a block diagram of a computer system for generating a graphical user interface on a display.

In FIG. 5, reference numeral 3 refers to a computer system with one or more operative computers and in each case one or more processors, which are connected to one or more displays 4, for example, touch-sensitive displays, in particular so-called multitouch displays. The computer system 4 comprises, for example, one or more of the above-described computer systems 1', 1'a, 1'b, 1'c, 1'd, 1", 1"a, 1"b, 1"c, 1"d, 2', 2'a, 2'b, 2", 2"a and/or 2"b.

As represented diagrammatically in FIG. 5, the computer system 3 comprises several functional modules, in particular a platform 30, a license manager 31, a plug-in manager 32, an area manager 33, at least one program application 34, a plug-in catalog 35, and stored (user-specific) widget configurations 36. The widget configurations 36 define the views, and the data contents of a widget to be displayed, which are to be used for a certain user. For example, widget configurations 36 are defined at the beginning in a user base configuration and later determined and stored in each case at the time of the shutdown of the application and/or logout of the user based on the current views and displayed data contents of the widgets.

The platform 30 comprises several components, in particular components of a run-time environment for supporting a service-oriented architecture platform, a dynamic application extension and graphic functions, for example, .NET components of Microsoft Corp. for WCF, MEF (Managed Extensibility Framework), and WPF (Windows Presentation Foundation).

The plug-in catalog 35 is implemented, for example, in MEF, and it comprises several plug-ins or references to stored plug-ins. Plug-ins are software components (computer programs), which extend an existing software-based program application, so that the program application is extended with the functions provided by the plug-in. The plug-ins are loadable and executable dynamically, for example, at the start up or during the runtime of a program application (application), as a complement to the program application. The plug-in catalog 35 comprises, in particular, a main window plug-in, several window area plug-ins, a login plug-in, a widget manager plug-in, and several widget plug-ins.

In the following sections, in reference to FIG. 6, as an example, a sequence of steps for generating a graphical user interface 6 for a program application 34 of a display 4 is described.

In step S1, loadable stored plug-ins or references to these plug-ins are loaded in the plug-in catalog 35, for example, via MEF. Step S1 is executed, for example, as a preparatory step as part of a system configuration. Each plug-in is provided with different attributes. These plug-in attributes define at least startup requirements and startup restrictions and they comprise in particular also language attributes and license attributes.

In step S2, the plug-ins in the plug-in catalog 35 are filtered based on their attributes after the program application 34 has been started. Here, the license manager 31 checks for each plug-in whether a valid license exists. In addition, the language to be used in the case of plug-ins with interface functions for the interaction with a user is checked.

In step S3, the plug-in manager 32 starts the plug-ins in accordance with their start requirements and start restrictions in the required, for example, user-specific, language, if a sufficient license for that purpose exists. The plug-ins are started via MEF, for example.

In step S31, the main window plug-in is started. As indicated with reference numeral S35, the main window plug-in on the display 4 represents a main window and it defines several sub-areas in the main window. As shown in FIG. 7a, the main window 60 is substantially merely a frame (shell) represented on the display 4, for which several sub-areas 61', 62', 63', 64', 65', which are not visible on the display 4, are defined. The sub-areas 61', 62', 63', 64', 65' are defined by the main window plug-in, for example, in WPF.

In step S32, the window area plug-ins are started additionally. As indicated with reference numeral S36, the main window plug-ins are registered in each case in the area manager 33.

In step S33, the widget manager plug-in is started. As indicated with reference numeral S37, the widget manager plug-in imports widget contexts, which are stored associated in each case with the window area plug-ins, for example, via MEF. The widget contexts define possible, permissible widgets, which can be inserted, for example, in an associated window area.

In step S34, the login plug-in is started. As indicated with reference numeral S38, the login plug-in is registered in the area manager 33.

Figure 6:
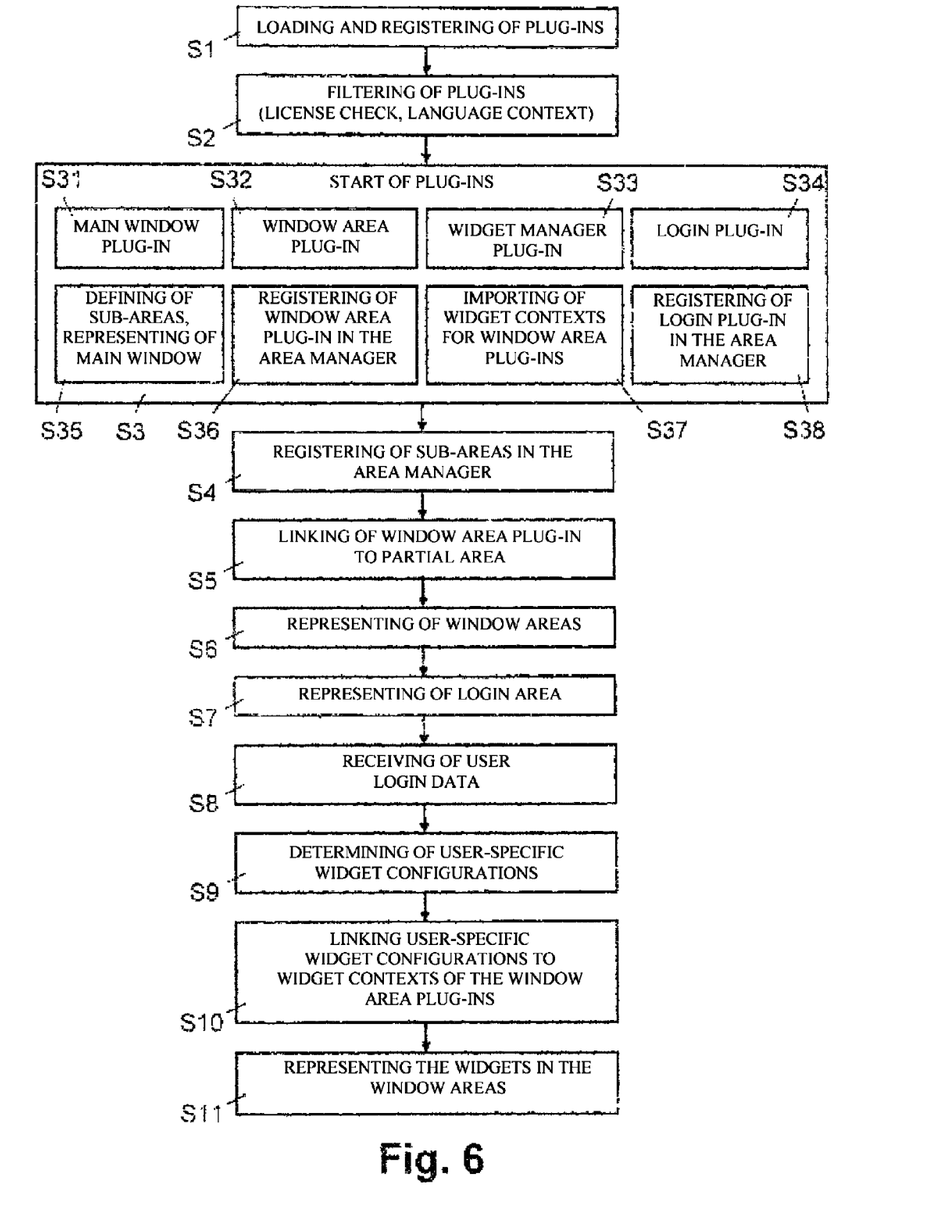
FIG. 6: shows a flow chart which diagrammatically illustrates an example of a sequence of steps for generating a graphical user interface on a display.
Figure 7A:
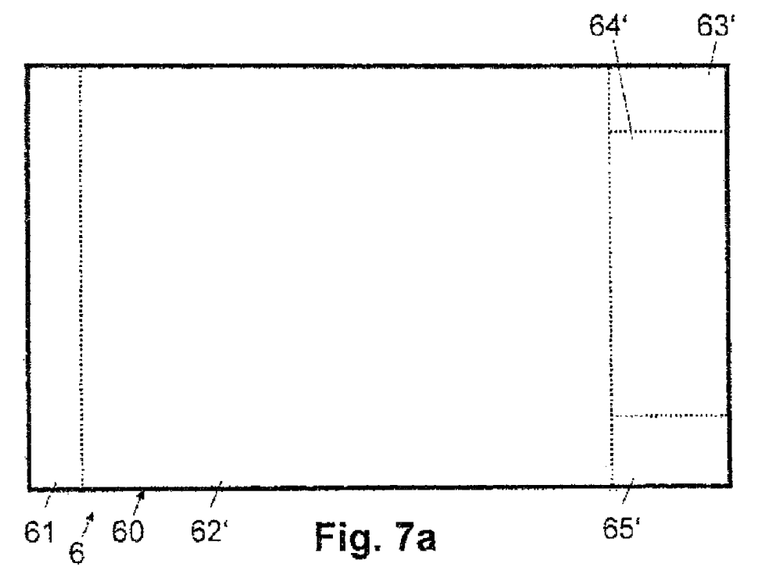
FIG. 7a: shows an example of a main window represented on a display.

In FIG. 6, in connection with step S3, only a selection of plug-ins is displayed, which are started, and which are of particular interest in connection with the generation of the graphical user interface 6. The person skilled in the art will understand, however, that additional plug-ins are also started, for example, the widget plug-ins.

In step S4, the sub-areas 61', 62', 63', 64', 65' defined in WPF, for example, are reported (registered) in the area manager 33, for example, by WPF, which in addition initializes all defined sub-areas 61', 62', 63', 64', 65'.

In step S5, the area manager 33 links the reported (registered) sub-areas 61', 62', 63', 64', 65' to the window area plug-ins, which are each provided for the sub-areas 61', 62', 63', 64', 65'. Here, the login plug-in in particular is also linked to the sub-area 63' provided for that purpose.

Figure 7B:
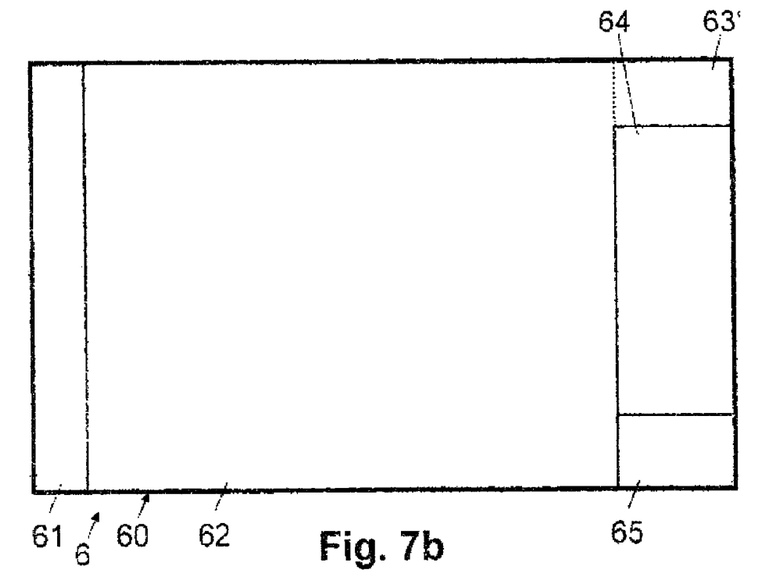
FIG. 7b: shows an example of several window areas of the main window, which are represented on the display.

In step S6, the window area plug-ins on the display 4 represent their window area in each case in the sub-area 61', 62', 64', 65' of the main window 60 to which they are linked. As shown in FIG. 7b, on the display 4, the window areas 61, 62, 64, 65 are now visibly represented in the main window 60 of the user interface 6.

Figure 7C:
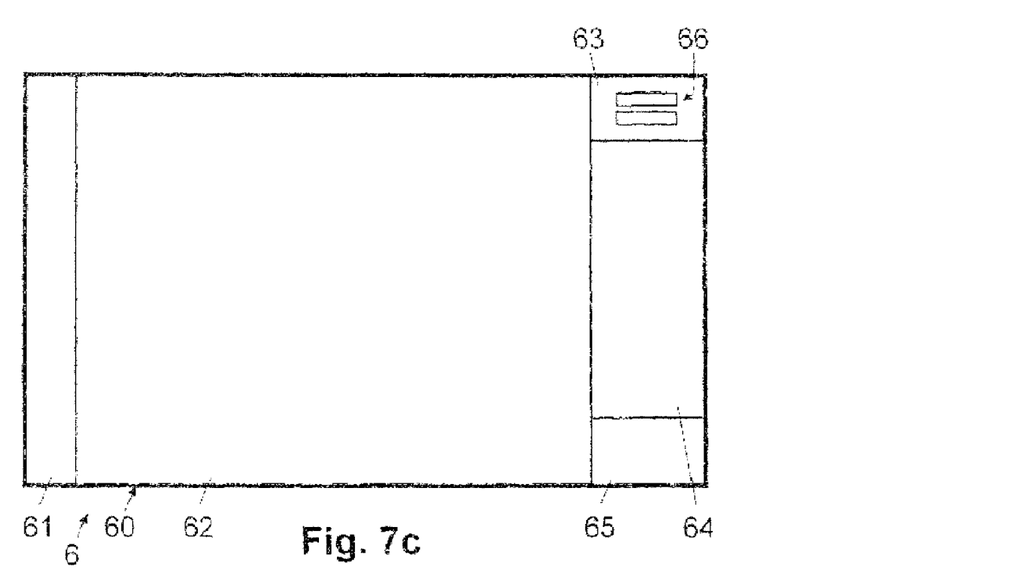
FIG. 7c: shows an example of the main window represented on the display, with several window areas and a represented login area.

In step S7, the login plug-in represents its login area on the display 4 in the sub-area 63' of the main window 60 to which it is linked. As shown in FIG. 7c, on the display 4, in addition to the window areas 61, 62, 64, 65, the login area 63 with corresponding login input fields 66 is now also visibly represented in the main window 60 of the user interface 6.

In step S8, the login plug-in receives login data from the user via the login input fields 66, for example, a user name and a password or access code.

In step S9, the widget manager plug-in, in accordance with the login of the (authorized) user, loads the stored user-specific widget configurations 36.

In step S10, the widget manager plug-in links the widget configurations 36 of the user to the previously imported widget contexts, which are associated with the window area plug-ins. Here, the views defined by the user-specific widget configurations 36 are linked to the widget contexts of the window areas.

Figure 7D:
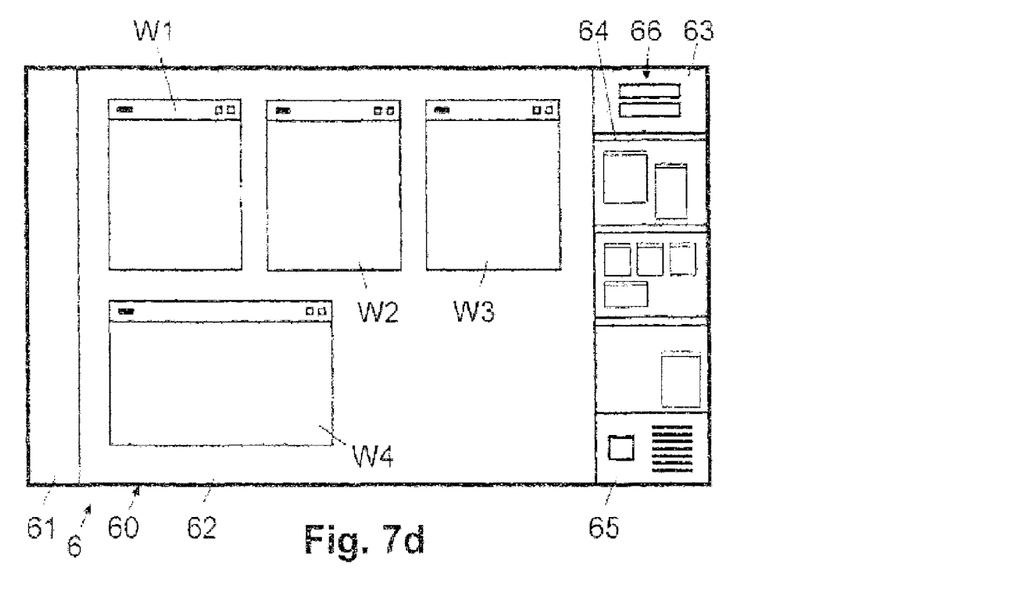
FIG. 7d: shows an example of the main window represented on the display, with a represented login area as well as several window areas and widgets represented therein.

In step S11, the widget plug-ins in each case generate their interface input elements and/or interface output elements and they insert themselves on the display 4 in each case in the window area to which they are linked by the certain widget contexts, and in particular in the view defined by the user-specific widget configurations 36, and in the data contents to be displayed therein. As shown in FIG. 7d, on the display 4 in the window areas 61, 62, 64, 65 of the main window 60 of the user interface 6, the widgets W1, W2, W3, W4 are now represented visibly in addition.

Finally, it should be indicated that the above-indicated functional modules are preferably implemented as programmed software modules, which comprise program code for controlling in each case one or more processors of a computer and are stored on a computer program product, which is connected permanently or detachably to the processors and which comprises a nonvolatile, accessible computer-readable medium. However, the person skilled in the art will understand that the functional modules can be implemented in alternative embodiment variants partially or completely by means of hardware components. In addition, it should be noted here that, although in the description computer program code has been associated with specific functional modules and the implementation of steps has been represented in a certain order, the person skilled in the art will nevertheless understand that the computer program code can be structured differently and that the order of at least certain steps can be changed, without deviating thereby from the protected subject matter.

What is claimed is:

1. A computerized machine control system comprising:
one or more processors programmed with executable instructions to implement at least,
  a communication module for communicating with applications of a higher-level management or operating system;
  an application-independent, machine-specific component comprising a machine-specific domain model with data points of a machine, and a control module which is configured to access the data points of the machine via a machine-specific communication protocol and to update corresponding data point objects in the machine-specific domain model or data points in the machine; and
  a machine-independent, application-specific component comprising an application-specific model with data objects accessible to the management or operating system, and a mapping module configured to access the machine-specific domain model and map data objects to data point objects or map data point objects to data objects.

2. The machine control system according to claim 1, wherein the control module is configured to periodically access the data points of the machine in order to update the corresponding data point objects in the machine-specific domain model, and in that the machine-specific domain model is configured to transfer values of data point objects in the machine-specific domain model only upon request to an application-specific part.

3. The machine control system according to claim 1, wherein the control module is configured to access the data points of the machine via a programmable logic controller, wherein the machine-specific communication protocol is configured specifically for the programmable logic controller, and the machine-specific domain model comprises data point objects of those data points of the machine that are available via the programmable logic controller.

4. The machine control system according to claim 3, wherein the control module is configured to update the data point objects in the machine-specific domain model only when the data points that have been accessed via the programmable logic controller are in a consistent status.

5. The machine control system according to claim 1, wherein the application-specific domain model is implemented as a service of a service-oriented architecture platform, which is accessible to the management or operating system, wherein a service definition and the data objects of the application-specific domain model are defined for the applications of the higher-level management or operating system via an interface of the service-oriented architecture platform, which is accessible to the management or operating system.

6. The machine control system according to claim 1, wherein the machine-specific domain model is implemented as an available service of a service-oriented architecture platform, wherein a service definition and the data point objects of the machine-specific domain model are defined via an interface of the service-oriented architecture platform, which is accessible to service consumers, and the service is accessible to the service consumers via the service-oriented architecture platform.

7. The machine control system according to claim 5, wherein the services of the service-oriented architecture platform are each configured to receive periodic hold-active calls from the higher-level management or operating system, and so as to respond directly with a hold-active response to guarantee connections to the management or operating system.

8. The machine control system according to claim 1, wherein the communication module comprises a run-time module with communication functions of the Windows Communication Foundation, and in that the application-specific domain model is implemented as a service of the Windows Communication Foundation, wherein a service definition and the data objects of the application-specific domain model are defined for the applications of the higher-level management or operating system via a contract interface of the Windows Communication Foundation.

9. The machine control system according to claim 1, wherein the control module is configured to periodically check by means of query messages the availability of the machine and assign a status value to the machine-specific domain model, which indicates that the machine-specific domain model is not connected to the machine, if there is no response message to the query message within a defined duration.

10. A computer program product comprising a non-transitory computer-readable medium with computer program code stored thereon for controlling one or more processors of a machine control system, so that the machine control system creates a machine-specific domain model with data points of a machine, domain model which is independent of applications of a higher-level management or operating system, and accesses the data points of the machine via a machine-specific communication protocol, and updates corresponding data point objects in the machine-specific domain model or data points in the machine; and creates a machine-independent, application-specific domain model with data objects which are accessible to the management or operating system, and accesses the machine-specific domain model and maps data objects to data point objects or data point objects to data objects.

11. The computer program product according to claim 10, wherein the computer program code for controlling the processors is further configured so that the machine control system periodically accesses the data points of the machine, in order to update the corresponding data point objects in the machine-specific domain model, and transfers values of data point objects in the machine-specific domain model only upon request to the application-specific domain model.

12. The computer program product according to claim 10, wherein the computer program code for controlling the processors is further configured so that the machine control system accesses the data points of the machine via a programmable logic controller, wherein the machine-specific communication protocol is geared specifically toward the programmable logic controller, and generates in the machine-specific domain model data point objects of the those data points of the machine that are available via the programmable logic controller.

13. The computer program product according to claim 12, wherein the computer program code for controlling the processors is further configured so that the machine control system updates the data point objects in the machine-specific domain model only when the data points which are accessed via the programmable logic controller are in a consistent status.

14. The computer program product according to claim 10, wherein the computer program code for controlling the processors is further configured so that the machine control system creates the application-specific domain model as a service of a service-oriented architecture platform, which is accessible to the management or operating system, and defines a service definition and the data objects of the application-specific domain model for the applications of the higher-level management or operating system via an interface of the service-oriented architecture platform, which is accessible to the management or operating system.

15. The computer program product according to claim 10, wherein the computer program code for controlling the processors is further configured so that the machine control system creates the machine-specific domain model as an available service of a service-oriented architecture platform, and defines a service definition and the data point objects of the machine-specific domain model via an interface of the service-oriented architecture platform, which is accessible to service consumers, wherein the service is accessible to the service consumers via the service-oriented architecture platform.

16. The computer program product according to claim 14, wherein the computer program code for controlling the processors is further configured so that the machine control system receives from the higher-level management or operating system periodic hold-active calls for the services of the service-oriented architecture platform, and directly responds with a hold-active response to guarantee connections to the management or operating system.

17. The computer program product according to claim 10, wherein the computer program code for controlling the processors is further configured so that the machine control system uses communication functions of the Windows Communication Foundation for communicating with applications of the higher-level management or operating system, realizes the application-specific domain model as a service of the Windows Communication Foundation, and defines a service definition and the data objects of the application-specific domain model for the applications of the higher-level management or operating system via a contract interface of the Windows Communication Foundation.

18. The computer program product according to claim 10, wherein the computer program code for controlling the processors is further configured so that the machine control system periodically checks by means of query messages the availability of the machine and associates a status value with the machine-specific domain model, a status value which indicates that the machine-specific domain model is not connected to the machine, if there is no response message to the query message within a defined duration.

* * * * *